US009083856B2

(12) United States Patent
Kozitsky et al.

(10) Patent No.: US 9,083,856 B2
(45) Date of Patent: Jul. 14, 2015

(54) VEHICLE SPEED MEASUREMENT METHOD AND SYSTEM UTILIZING A SINGLE IMAGE CAPTURING UNIT

(75) Inventors: Vladimir Kozitsky, Rochester, NY (US); Wencheng Wu, Webster, NY (US); Martin Edward Hoover, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 439 days.

(21) Appl. No.: 13/411,032

(22) Filed: Mar. 2, 2012

(65) Prior Publication Data

US 2013/0229517 A1 Sep. 5, 2013

(51) Int. Cl.
*G06K 9/00* (2006.01)
*H04N 7/18* (2006.01)

(52) U.S. Cl.
CPC ...................................... *H04N 7/18* (2013.01)

(58) Field of Classification Search
CPC ............ G08G 1/054; G06K 9/00; H04N 7/18
USPC .......... 348/135, 148, 149, 150; 382/104, 105, 382/106, 107
See application file for complete search history.

(56) References Cited

U.S. PATENT DOCUMENTS

| 5,734,337 | A | 3/1998 | Kupersmit |
| 6,628,804 | B1 | 9/2003 | Edanami |
| 6,681,195 | B1 | 1/2004 | Poland et al. |
| 2010/0111365 | A1 | 5/2010 | Dixon et al. |
| 2010/0158321 | A1 | 6/2010 | Shah et al. |
| 2011/0267460 | A1 | 11/2011 | Wang |
| 2013/0182114 | A1* | 7/2013 | Zhang et al. ................... 348/150 |

FOREIGN PATENT DOCUMENTS

| CN | 101105893 A | * | 1/2008 | |
| CN | 101750049 A | * | 6/2010 | |
| JP | 2001126184 A | * | 5/2001 | ............ G08G 1/054 |

* cited by examiner

*Primary Examiner* — Sath V Perungavoor
*Assistant Examiner* — Albert Kir
(74) *Attorney, Agent, or Firm* — Luis M. Ortiz; Kermit D. Lopez; Ortiz & Lopez, PLLC (57) ABSTRACT

A vehicle speed measurement method and system for identifying a violating vehicle utilizing single image capturing unit. A vehicle image can be captured by the image capturing unit in order to estimate speed of the vehicle utilizing an ALPR unit. The license plate characters can be located and extracted from the captured image. A distance of the license plate from the image capturing unit can be calculated utilizing a physical character height from a reference point of the image capturing unit and a pixel character height generated by the ALPR unit. A position of the license plate in the field of view of the image capturing unit along with the distance information can be utilized to determine a height of the license plate from a road surface. The height of the license plate can be employed to accurately estimate the vehicle speed.

15 Claims, 9 Drawing Sheets

VEHICLE SPEED MEASUREMENT METHOD AND SYSTEM UTILIZING A SINGLE IMAGE CAPTURING UNIT

TECHNICAL FIELD

Embodiments are generally related to data-processing systems. Embodiments are also related to vehicle speed monitoring techniques, methods, and systems. Embodiments are additionally related to ALPR (Automatic License Plate Recognition) techniques, methods, and systems. Embodiments are further related to image processing methods and systems. Embodiments are also related to the measurement of vehicle speed utilizing a single image capturing unit.

BACKGROUND OF THE INVENTION

Vehicle speed measurement and enforcement systems can be employed to monitor traffic and identify vehicles moving faster than the posted speed limit. Such vehicle speed measurement systems can employ ALPR (Automatic License Plate Recognition) systems to determine an accurate speed of a vehicle. ALPR (Automatic License Plate Recognition) system often functions as the core module of "intelligent" transportation infrastructure applications. License plate recognition can be employed to identify the vehicle by automatically reading a license plate utilizing an image processing and character recognition technology. A license plate recognition operation can be performed by locating the license plate in an image, segmenting the characters in the plate, and performing an OCR (Optical Character Recognition) operation with respect to the characters identified.

The majority of prior art vehicle speed measurement systems utilize one or more single image capturing units (e.g., camera) to measure the speed by calculating a distance traveled by the vehicle over multiple frames. The time between frames is known and often fixed so that the speed can be calculated by dividing the distance traveled over time. The vehicle can be tracked utilizing features of the vehicle and the movement of the features can be employed to estimate the speed. Consequently, several problems arise when multiple vehicles enter the field of view of the image capturing unit at similar time traveling at similar speed.

One such problem is that two vehicles and their associated features appear as a single vehicle thus leading to obvious errors. A solution to this problem involves identifying and tracking the vehicle license plate as a relevant feature. Furthermore, if a speed violation is detected a plate code is required to issue the citation. Another problem is that the height of the features changes from vehicle to vehicle due to variety of the vehicle height, shape, as well as location of the license plate, if the license plate is utilized for tracking. Such varying feature heights with respect to the road surface for fixed camera installation change the effective distance that the feature travels for a fixed speed from a reference point of the pole mounted camera thus adding error to the speed measurement. An extra speed sensor such as, for example, radar, laser, multiple cameras (stereoscopic), etc., can be employed to solve the problem, however, such extra sensors add unnecessary cost and complexity.

Based on the foregoing, it is believed that a need exists for an improved vehicle speed measurement method and system. A need also exists for an improved method for measuring height of a license plate from a road surface, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved vehicle speed measuring methods and systems.

It is another aspect of the disclosed embodiments to provide for an improved ALPR (Automatic License Plate Recognition) systems and methods.

It is a further aspect of the disclosed embodiments to provide for an improved method for measuring a height of a license plate from a road surface.

The aforementioned aspects and other objectives and advantages can now be achieved as described herein. A vehicle speed measurement method and system for identifying a violating vehicle utilizing single image capturing unit is disclosed herein. A vehicle image can be captured by the image capturing unit in order to estimate speed of the vehicle utilizing an ALPR (Automatic License Plate Recognition) unit. The license plate characters can be located and extracted for the captured image. A distance of the license plate from the image capturing unit can be calculated utilizing a physical character height from a reference point of the image capturing unit and a pixel character height generated by the ALPR unit. A ground map that translates a distance of the ground from the image capturing unit for each pixel in the image capturing unit field of view can be generated utilizing a calibration process. A position of the license plate in the field of view of the image capturing unit along with the distance information can effectively be utilized to determine a height of the license plate from a road surface. The height of the license plate can be employed to accurately estimate the vehicle speed.

In one embodiment, the calibration process can be performed utilizing a reference vehicle with a plate (or multiple plates) attached at a known height(s). The vehicle can be driven through the field of view of the image capturing unit multiple times across multiple lanes in order to cover as much of the road surface as possible. The accurate ground map can be built to cover multiple cases. Each frame captured can be passed to the ALPR unit and ALPR data, for example, plate code, plate center coordinates, and character heights can be saved. The data can be employed to build the lookup table to map the three parameters to the plate height from the ground level. The plate code can be employed as a reference data to determine the license plate height.

In another embodiment, the calibration process can be performed utilizing a hitch calibration target comprising of two vertical risers with rice shaped reflective targets (e.g., horizontal or vertical targets) spaced at equal increments (e.g., 6") and a horizontal grid of reflective globes spaced at a known spacing. A number of data points can be collected for each pass of the vehicle through the field of view of the image capturing unit, thus requiring fewer passes utilizing the target. A center of the reflective globes and/or strips can be located by considering the known spacing and center for each close pair and a height of the center as a function of distance and x,y position can be calculated.

The localization of the license plate in the captured video frame can be performed and the characters that comprise the plate code can be segmented to remove various spatial distortions such as rotation and shear. The height of the image capturing unit and the height of the license plate above the ground can be determined for each installation. The plate code, state information, center position [X,Y] coordinates of the license plate can be extracted by the ALPR unit and the state information can be utilized as query into the lookup table to extract the corresponding character height for that particular state. The distance of ground can be calculated utilizing the image capturing unit height and a theta value. The distance of ground and the center position coordinates can be saved and the process can be repeated for each captured frame. The ground map can be employed to obtain the distance of ground from the image capturing unit. The plate height can be computed utilizing the image capturing unit height, the distance of plate, and the theta value.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
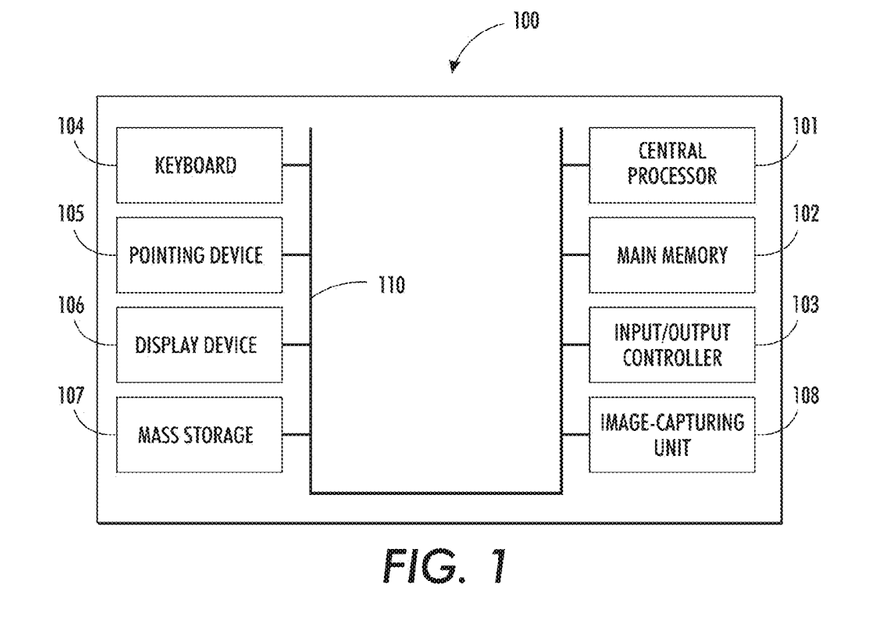
FIG. 1 illustrates a schematic view of a computer system, in accordance with the disclosed embodiments.
Figure 2:
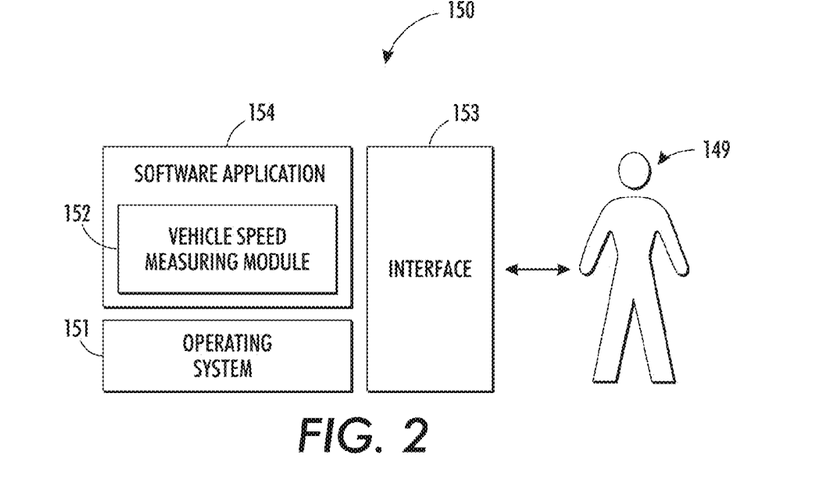
FIG. 2 illustrates a schematic view of a software system including a vehicle speed measuring module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device such as a mouse, track ball, and pen device, etc.), a display device 106, a mass storage 107 (e.g., a hard disk), an image capturing unit 108 and a USB (Universal Serial Bus) peripheral connection. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), also serves to display results, whereupon the user may supply additional inputs or terminate the session. In an embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. The software application 154 can include a vehicle speed measuring module 152 for identifying a violating vehicle utilizing single image capturing unit. Software application 154, on the other hand, can include instructions such as the various operations described herein with respect to the various components and modules described herein such as, for example, the methods 600 and 700 depicted in FIGS. 6-7.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, UNIX, LINUX, and the like.

Figure 3:
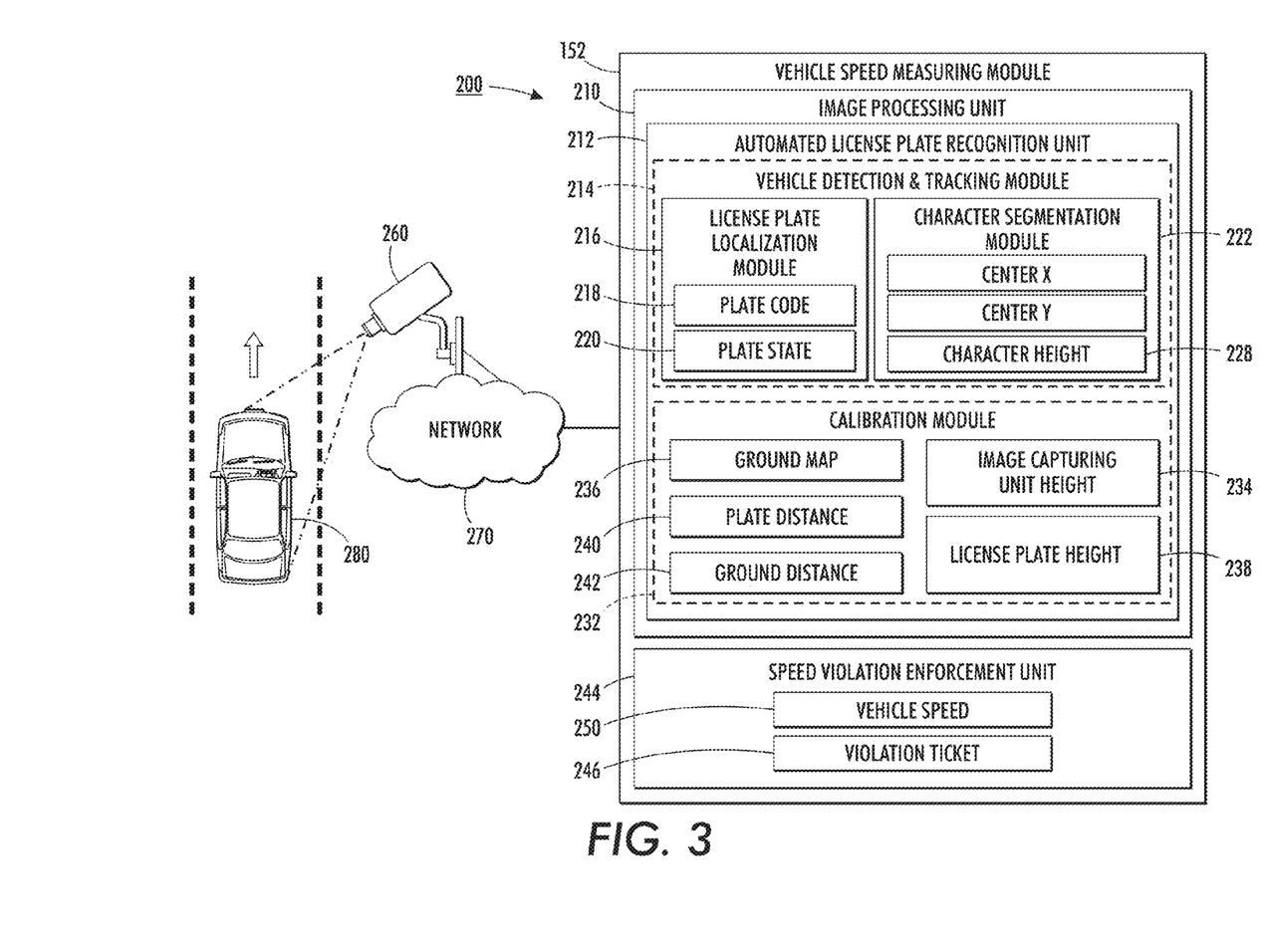
FIG. 3 illustrates a block diagram of a vehicle speed measuring system, in accordance with the disclosed embodiments.

FIG. 3 illustrates a block diagram of a vehicle speed measurement system 200, in accordance with the disclosed embodiments. The vehicle speed measurement system 200 measures the speed of a vehicle 280 with high accuracy utilizing single image capturing unit 260 (e.g., camera) mounted to a supporting pole installed at the side of a road. The image capturing unit 260 integrated with an image processing unit 210 continuously monitors traffic and analyzes the speed of the vehicle 280 within an effective field of view. The image capturing unit 260 can be operatively connected to the image processing unit 210 via a network 270.

Note that the network 270 may employ any network topology, transmission medium, or network protocol. The network 270 may include connections such as wire, wireless communication links, or fiber optic cables. Network 270 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The image capturing unit 260 may include built-in integrated functions such as image processing, data formatting, and data compression functions. Also, the unit 260 includes imager-positioning, range-finding, and a flash bulb. Note that the image capturing unit 260 described in greater detail herein are analogous or similar to the image capturing unit 108 of the data-processing system 100, depicted in FIG. 1. The image processing unit 210 receives the captured image from the image capturing unit 260 in order to process the image. The image processing unit 210 is preferably a small, handheld computer device or palmtop computer as depicted in FIG. 1 that provides portability and is adapted for easy mounting. The images captured by the image capturing unit 260 are time stamped and each pixel belongs to a frame (image) in the video. The frames can be captured from the image capturing unit 260 at typically fixed time intervals such as determined by the frame rate.

The images captured by the image capturing unit 260 typically include at least one image of the vehicle 280 committing the violation (i.e., running the red light) as well as images of the vehicle license plate to provide vehicle identification information. The image processing unit 210 can be configured to include the vehicle speed measuring module 152 integrated with an automated license plate recognition unit 212 to accurately locate the license plate of the vehicle 280. Note that the license plate recognition unit 212 is capable of reading the license plate on the front of the vehicle 280 as well as the rear.

The license plate recognition unit 212 further includes a vehicle detection and tracking unit 214 and a calibration unit 232. It can be appreciated that the automated license plate recognition unit 212 and a speed violation enforcement unit 244 can be implemented as software modules. The vehicle detection and tracking module 214 includes a license plate localization module 216 and a character segmentation module 222 to locate and extract the license plate characters for the captured image. The license plate localization module 216 performs localization of the license plate in the captured video frame and segments the characters that comprise a plate code 218 to remove various spatial distortions such as rotation and shear.

The plate code 218, state information 220, and center position [X,Y] coordinates of the license plate can be extracted by the ALPR unit 212 and the state information 220 can be utilized as query into a lookup table to extract the corresponding character height for that particular state. The calibration module 232 includes a ground map 236 to automatically calculate a license plate height 238 from the ground during normal tracking and enforcement. The ground map 236 translates a distance of the ground 242 from the image capturing unit 260 for each pixel in the image capturing unit field of view. A height of the image capturing unit 234 and the height of the license plate 238 above ground can be determined for each installation.

The calibration module 232 calculates a distance of the license plate 240 from the image capturing unit 260 utilizing a physical character height from a reference point of the image capturing unit 260 and a pixel character height generated by the ALPR unit 212. The physical character height and the pixel character height along with an optical parameter of the image capturing unit 260 such as lens focal length and sensor resolution can be employed to calculate the distance of the license plate 240 from the image capturing unit 260 utilizing the predetermined mapping 236. A position of the license plate in the field of view of the image capturing unit 260 along with the distance information 242 can effectively be utilized to determine a height of the license plate 238 from a road surface.

The height of the license plate 238 can be employed to accurately estimate the vehicle speed 250. Based on the vehicle license plate information, the details of the vehicle 280 and its owner can then be accessed at an appropriate motor vehicles department. The speed violation enforcement unit 244 issues a violation ticket 246 when a violator is detected with a speed greater than the predetermined value. Note that the embodiments discussed herein should not be construed in any limited sense. It can be appreciated that such embodiments reveal details of the structure of a preferred form necessary for a better understanding of the invention and may be subject to change by skilled persons within the scope of the invention without departing from the concept thereof.

Figure 4:
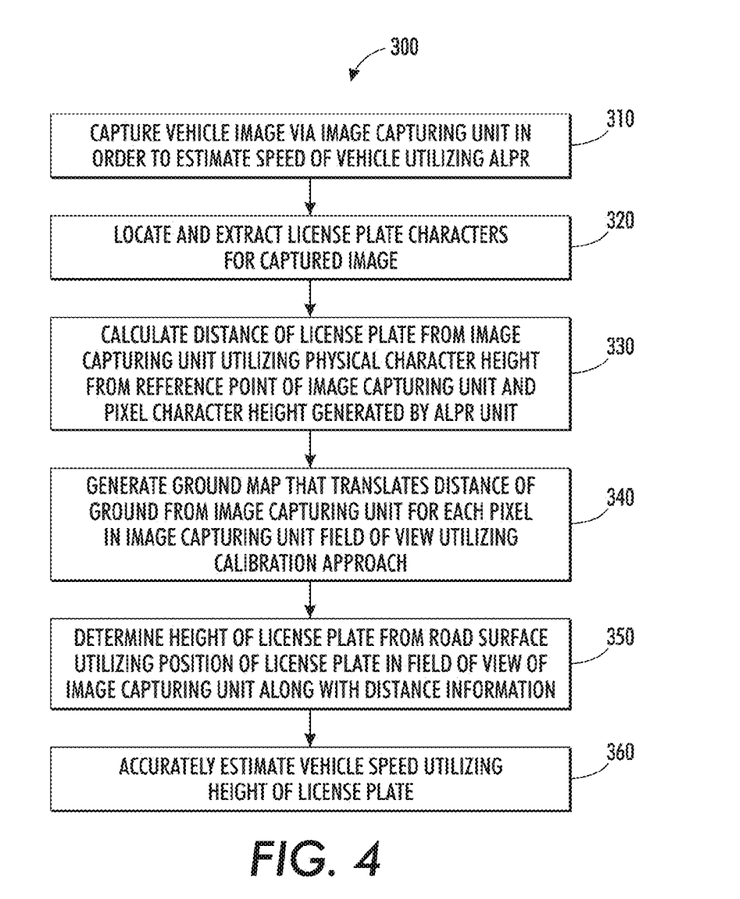
FIG. 4 illustrates a high level flow chart of operation illustrating logical operational steps of a method for identifying a violating vehicle utilizing single image capturing unit, in accordance with the disclosed embodiments.

FIG. 4 illustrates a high level flow chart of operation illustrating logical operational steps of a method 300 for identifying a violating vehicle utilizing the image capturing unit 260, in accordance with the disclosed embodiments. It can be appreciated that the logical operational steps shown in FIG. 4 can be implemented or provided via, for example, a module such as module 152 shown in FIG. 2 and can be processed via a processor such as, for example, the processor 101 shown in FIG. 1. Initially, as indicated at block 310, a vehicle image can be captured by the image capturing unit 260 in order to estimate speed of the vehicle 280 utilizing the ALPR unit 212. The license plate characters can be located and extracted for the captured image, as shown at block 320.

Figure 5:
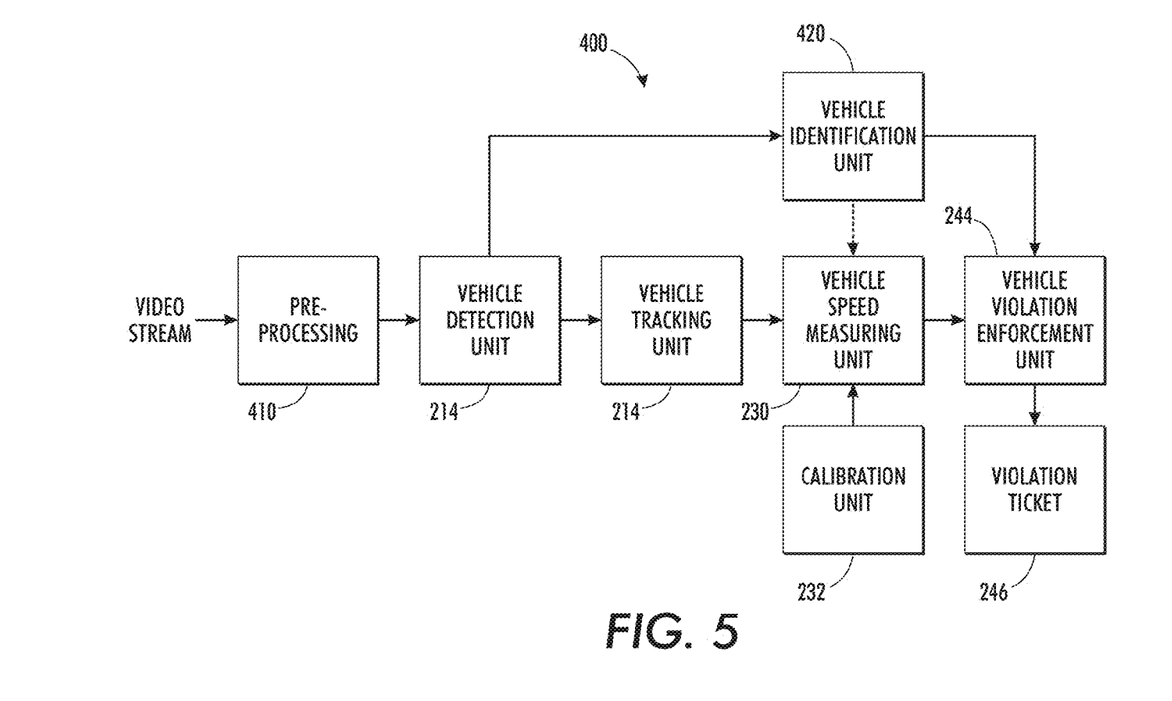
FIG. 5 illustrates a detailed block diagram of a video-based speed enforcement system, in accordance with the disclosed embodiments.

FIG. 5 illustrates a detailed block diagram of a video-based speed enforcement system 400, in accordance with the disclosed embodiments. The video-based speed enforcement system 400 includes a pre-processing unit 410, the vehicle detection and tracking unit 214, the vehicle speed measuring unit 230, and the speed violation enforcement unit 244. The pre-processing unit 410 and the vehicle detection and tracking unit 214 identifies features of the vehicle 280 when the vehicle 280 enters the field of view of the image capturing unit 260 and tracks the vehicle specific features as the vehicle 280 moves through the field of view of the image capturing unit 260. The vehicle speed measuring unit 230 in association with the vehicle identification unit 420 and the calibration unit 232 measures the speed of the vehicle 280. The speed violation enforcement unit 244 identifies a violating vehicle utilizing the single image capturing unit 260 and issues the violation ticket 246.

Figure 6:
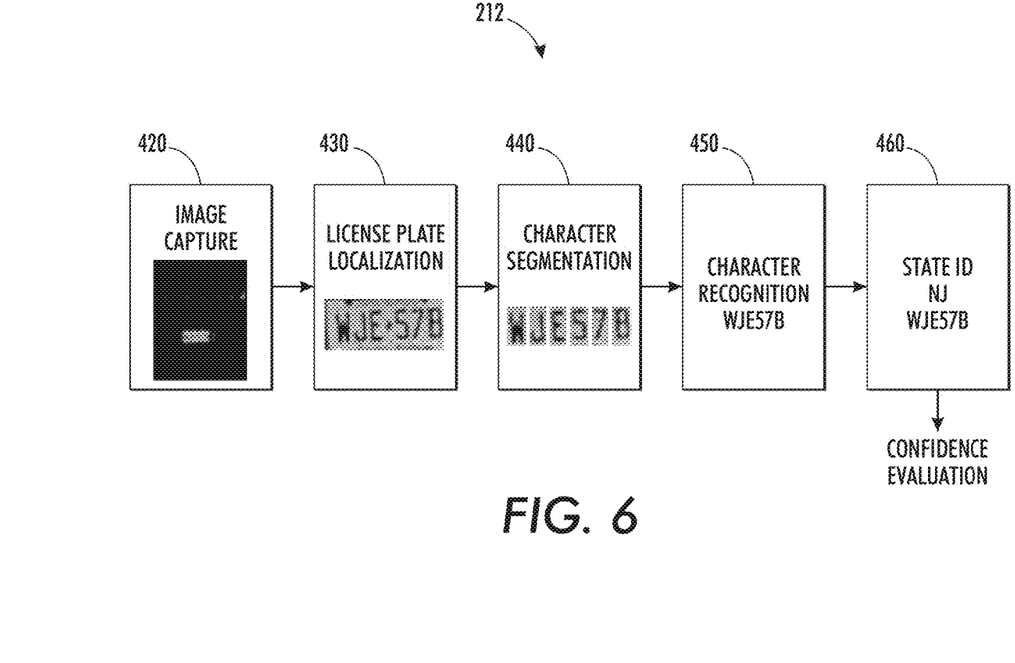
FIG. 6 illustrates a block diagram of an automatic license plate recognition system, in accordance with the disclosed embodiments.

FIG. 6 illustrates a block diagram of the ALPR unit 212, in accordance with the disclosed embodiments. The ALPR unit 212 can be employed to determine the plate code 218. In general, ALPR is a mass surveillance method that uses optical character recognition on images to read vehicle registration plates. The localization of license plates in the captured video frame can be performed thus providing the features that can be tracked over time to determine speed, as indicated at blocks 420 and 430. Next, the characters that comprise the plate code 218 can be segmented, as shown at block 440. The character segmentation process removes various spatial distortions such as rotation and shear. Once the characters are segmented, their pixel heights can be easily determined and utilized as part of a character normalization process of scaling to a fixed height that matches the height of characters in the OCR training set. The character can be recognized and the state id can be employed for confidence evaluation, as indicated at blocks 450 and 460.

Figure 7:
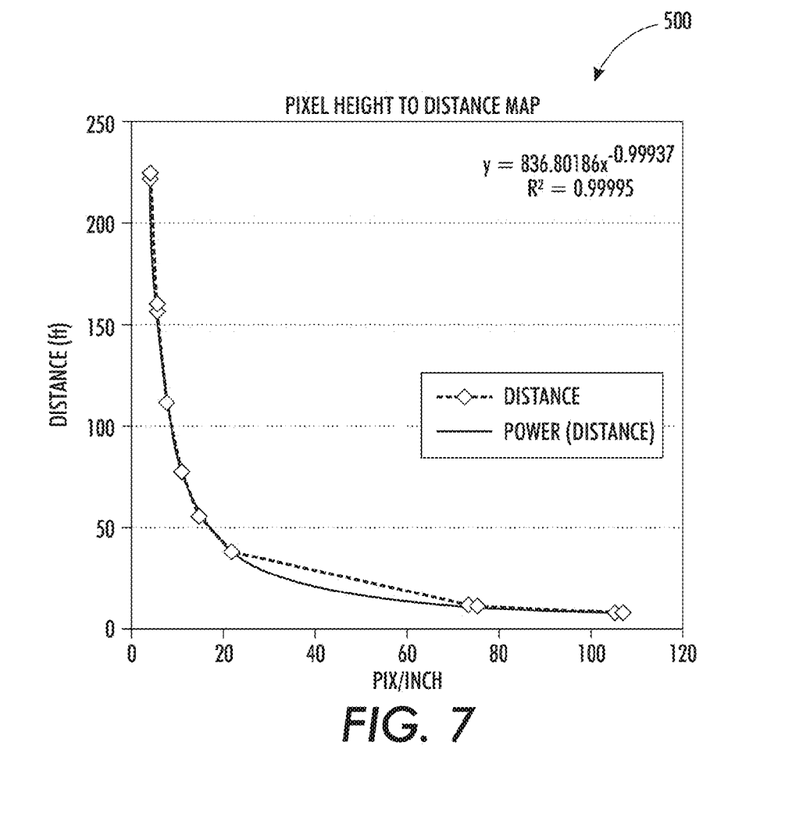
FIG. 7 illustrates a graph depicting mapping of a character pixel height to a real world distance from an image capturing unit, in accordance with the disclosed embodiments.

A distance of the license plate from the image capturing unit 260 can be calculated utilizing the physical character height from a reference point of the image capturing unit 260 and a pixel character height generated by the ALPR unit 212, as indicated at block 330. FIG. 7 illustrates a graph 500 depicting mapping of a character pixel height to a real world distance from the image capturing unit 260, in accordance with the disclosed embodiments. The height of any individual character may be noisy with respect to the constraints of the imaging unit 260 and atmospheric conditions and quantized when represented with a small number of pixels. The license plates may have 6-8 characters and in turn 6-8 independent character heights. An average of 6-8 heights provides a robust estimate of the actual character height on a sub-pixel level. Additionally, there is a lower acceptable limit of character height of ~20 pixels for accurate OCR and the speed enforcement imaging system 400 can be typically designed to ensure this across the field of enforcement.

The actual shapes and heights of the plate characters are fixed for a particular state (fixed font). The ALPR unit 212 may return both the plate code 218 and jurisdiction or state information 220. The state result 220 can be employed as query into the lookup table to extract the corresponding character height for that particular state. For example, characters on a NY plate are 2.75" high. With the 20 pixel requirement for ALPR, the ALPR unit 212 translates to a worst case effective resolution of 7.2 pixels/inch (0.14 inches/pixel). The actual and expected character height along with the optical parameters of the imaging unit 260 can be employed to calculate the distance of the license plate 238 from the imaging unit 260.

FIG. 7 illustrates the mapping of the character pixel height to distance. The mapping can be modeled by a power law with the equation included in FIG. 7. The mapping can be derived offline experimentally or mathematically for set of camera and lens specifications. The distance information along with the center position of the license plate can be employed to calculate the height of the license plate 238. The center position [X,Y] coordinates of the license plate can be returned from the plate localization step 430 of the ALPR unit 212. For example, if the image capturing unit 260 is fixed on a pole, its field of view may not change over time. A calibration can be carried out when the image capturing unit 260 can be installed to build a map from 3 dimensional space to actual license plate height 238 from the ground as represented by below in equation (1).

$$\text{License Plate Height} = f(\text{Center\_LP\_}X, \text{Center\_LP\_}Y, \text{Character\_Height}) \quad (1)$$

Figure 8:
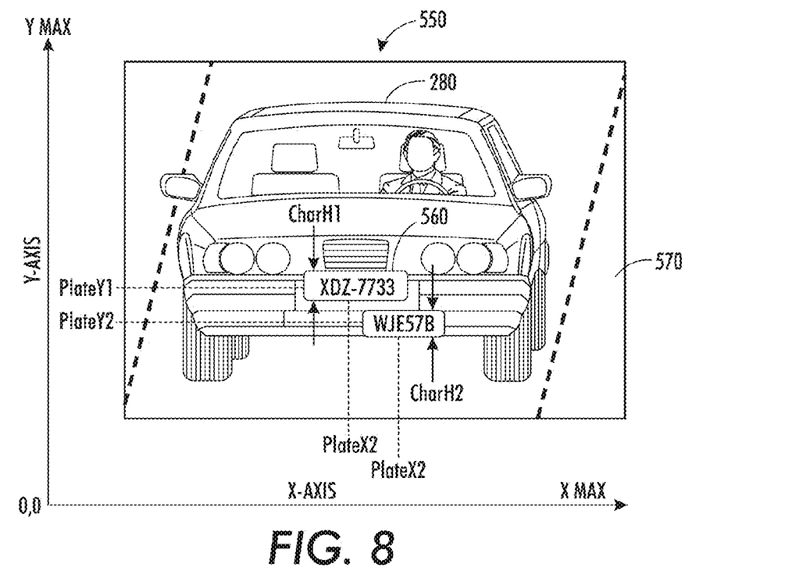
FIG. 8 illustrates a schematic view of a captured frame and relevant measurements with respect to a calibration process, in accordance with the disclosed embodiments.

The ground map 236 that translates the distance of the ground 242 from the image capturing unit 260 for each pixel in the image capturing unit field of view can be generated utilizing a calibration process 550, as illustrated at block 340. FIG. 8 illustrates a schematic view of a captured frame 570 and relevant measurements with respect to a calibration process 550, in accordance with the disclosed embodiments. The calibration process 550 includes the reference vehicle 280 with a plate (or multiple plates) 560 attached at a known height(s). The vehicle 280 can be driven through the field of view of the image capturing unit 260 multiple times across multiple lanes in order to cover as much of the road surface as possible.

The accurate ground map 236 can be bunt to cover cases where the license plates 560 can be mounted in extreme positions and/or where the vehicle 280 is not centered within a lane. Each frame captured can be passed to the ALPR unit 212 and ALPR data such as plate code 218, plate center coordinates, and character heights 228 can be saved. The data can be employed to build the lookup table mapping the three parameters to the plate height 238 from the ground level. The plate code 218 can be employed as a reference data for the ALPR result back to the known plate height.

Figure 9:
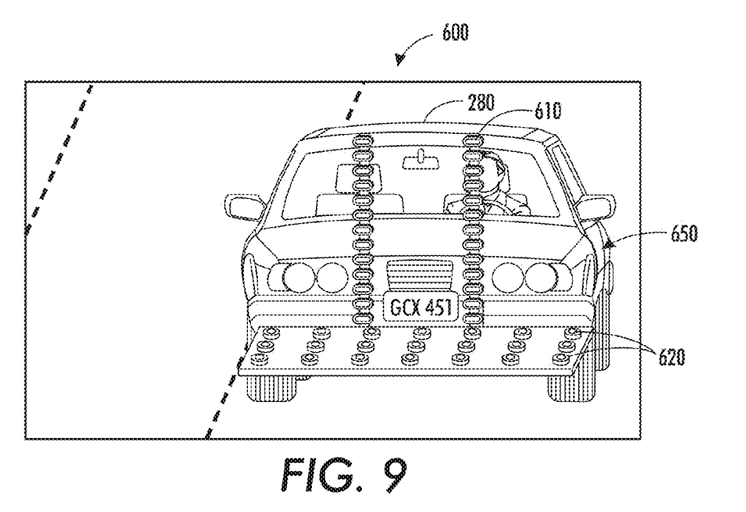
FIG. 9 illustrates a schematic view of a hitch calibration target with respect to the calibration process, in accordance with the disclosed embodiments.

FIG. 9 illustrates a schematic view of a hitch calibration target 650 with respect to the calibration process 600, in accordance with the disclosed embodiments. The hitch calibration target 650 includes two vertical risers 610 with rice shaped reflective targets (e.g., horizontal or vertical targets) spaced at equal increments (e.g., 6") and a horizontal grid of reflective globes 620 spaced at a known spacing. A number of data points can be collected for each pass of the vehicle 280 through the field of view, thus requiring fewer passes utilizing the target. The calibration process 600 involves locating a center of the reflective globes 620 and/or strips, taking into account the known spacing, calculating a center for each close pair, and computing a height of the center as a function of distance and x,y position. The difference between the two calibration processes is shown in Table. 1.

TABLE 1

| | Calibration Process | |
| --- | --- | --- |
| | Process 550 | Process 600 |
| Feature Height | License Plate Height | Height of Center of Two Reflectors |
| Feature Distance | Pixels/inch of mean character Height | Pixels/inch Spacing of Two Reflectors |

Figure 10:
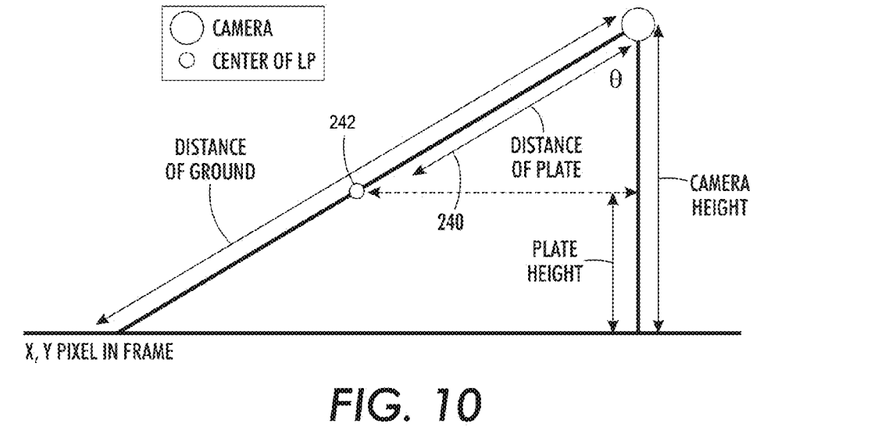
FIG. 10 illustrates a graph depicting geometry for calibration and runtime, in accordance with the disclosed embodiments.

The position of the license plate in the field of view of the image capturing unit 260 along with the distance information 240 and 242 can effectively be utilized to determine the height of the license plate 238 from a road surface, as indicated at block 350. Finally, the height of the license plate 238 can be employed to accurately estimate the vehicle speed, as shown at block 360. FIG. 10 illustrates a graph depicting geometry for calibration and runtime, in accordance with the disclosed embodiments. The key output of calibration is the ground map 236 that translates the distance of the ground or pavement for each x and y position in the captured 2D frame. The ground map 236 can be employed to automatically calculate the height of license plate 238 during normal tracking and enforcement.

Referencing FIG. 10, the height of the image capturing unit 260 is known for each particular installation. The height of the license plate above ground 238 on any given vehicle being used for calibration is also known. For each captured frame, the ALPR unit 212 returns the plate code 218, the plate state 220, centerX and centerY as well as mean character height 228 in pixels. The physical character height is known for the state and the pixel height can be divided by the physical height to obtain pixels/inch. Using the predetermined mapping in FIG. 7, the pixel/inch can be converted into distance from the image capturing unit 260 in feet to provide the distance of the plate 240. The value for theta can be solved as show below in equation (2).

$$\text{theta} = \cos^{-1}((\text{camera height} - \text{plate height})/\text{distance of plate}) \quad (2)$$

The distance of ground 242 can be calculated as shown below in equation (3).

$$\text{distance of ground} = \text{camera height}/\cos(\text{theta}) \quad (3)$$

The distance of ground 242 and the center X and center Y information can be saved and the process can be repeated for each captured frame. Each x and y pixel in the image capturing unit frame can be interpolated and extrapolated.

Figure 11:
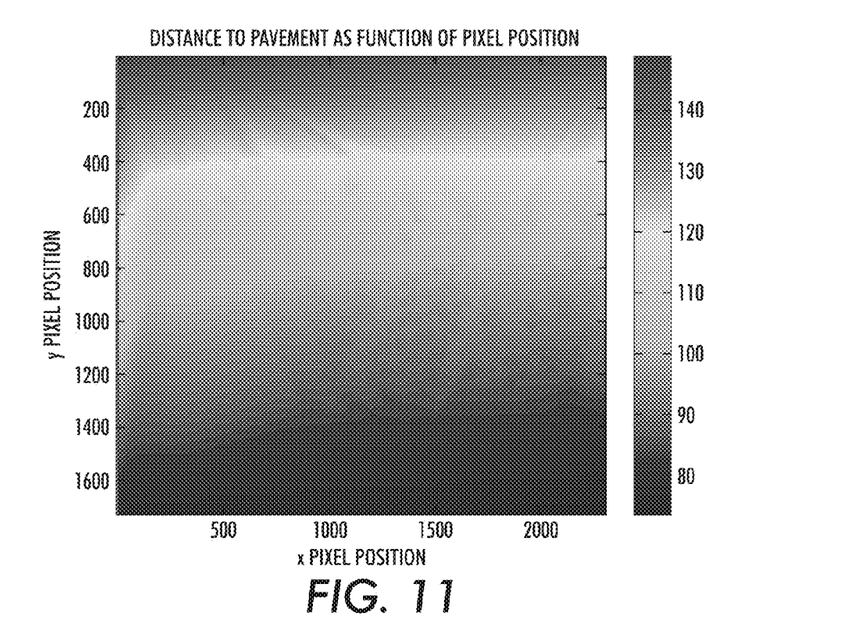
FIG. 11 illustrates a graph depicting mapping of pixel position to distance of pavement, in accordance with the disclosed embodiments.

FIG. 11 illustrates a graph depicting mapping of pixel position to distance of pavement, in accordance with the disclosed embodiments. The ground map 236 can be generated as shown in FIG. 11. For example, the closest distance of the ground from the image capturing unit, for example, Dalsa 4M60 camera is pixel (2304, 1728) (x,y) since the camera is mounted on the right side of the roadway focusing into the distance. Pixel (1, 1) is across the road from the camera and off into the distance in turn the furthest ground point in view of the camera. During real-world tracking and enforcement, the camera height is known. For each captured frame, the ALPR unit 212 returns the plate code 218, plate state 220, center X and center Y, and the mean character height 228 in pixels. The physical character height can be known for the state and the pixel height can be divided by the physical height to obtain pixels/inch. Using the predetermined mapping in FIG. 7, the pixel/inch can be converted into distance from the image capturing unit 260 in feet to provide the distance of the plate 240. The ground map can be employed to obtain distance of the ground from the image capturing unit based on the center X and center Y coordinates. The value for theta can be solved as show below in equation (4).

$$\text{theta}=\cos^{-1}(\text{camera height}/\text{distance of plate}) \quad (4)$$

The plate height can be calculated as shown below in equation (5).

$$\text{plate height}=\text{camera height}-\text{distance of plate}*\cos(\text{theta}) \quad (5)$$

Such an approach estimates the height of features employed for speed measurement in order to improve the accuracy of the speed estimate without relying on external sensors or additional cameras. The system includes fewer physical resources required to eliminate similar errors in the vehicle speed calculations.

Based on the foregoing, it can be appreciated that a number of embodiments, preferred and alternative, are disclosed herein. For example, in an embodiment, a vehicle speed measurement method can be implemented for identifying a violating vehicle. Such a method can include, for example, the steps or operations of capturing a vehicle image utilizing at least one image capturing unit in order to estimate a speed of the vehicle via an automatic license plate recognition unit and thereafter locate and extract license plate character data from the vehicle image; calculating a license plate distance from the image capturing unit utilizing a physical character height from a reference point of the image capturing unit and a pixel character height generated by the automatic license plate recognition unit; generating a ground map that translates a distance of ground from the image capturing unit for each pixel in a field of view of the image capturing unit; and determining a license plate height from a road surface utilizing a position of the license plate in the field of view in association with the distance information to thereafter accurately estimate the vehicle speed based on the license plate height.

In another embodiment, the step or operation of generating a ground map that translates a distance of ground from the image capturing unit for each pixel in a field of view of the image capturing unit can further include or involve an operation for generating a ground map that translates a distance of ground from the image capturing unit for each pixel in a field of view of the image capturing unit utilizing a calibration process.

In still another embodiment, a step or operation can be provided for implementing the aforementioned calibration process by driving a reference vehicle having at least one plate attached to at least one height via the field of view of the image capturing unit a plurality of times across a plurality of lanes in order to cover the road; accurately building the ground map to cover a plurality of cases and thereafter passing each captured frame to the automatic license plate recognition unit to save automatic license plate recognition data; and configuring a lookup table to map the license plate recognition data to the license plate height from a ground level.

In yet other embodiments, the license plate recognition data can include, for example, one or more of a license plate code, at least one license plate center coordinate, and a license plate character height, etc. In other embodiments, a step or operation can be implemented for determining the license plate height utilizing the plate code as a reference data.

In another embodiment, a step or operation can be provided for implementing the calibration process by configuring a hitch calibration target having at least two vertical risers with a plurality of rice shaped reflective targets spaced at an equal increment and a horizontal grid of reflective globes spaced at a known spacing; collecting a plurality of data points for each pass of the vehicle through the field of view of the image capturing unit thereby requiring fewer passes utilizing the hitch calibration target; and locating a center of the plurality of reflective globes by considering a known spacing and thereby calculating a center for each close pair and a height of the center as a function of distance and a x,y position.

In another embodiment, steps or operations can be implemented for localizing the license plate in the vehicle image and segmenting the license plate character data including the license plate code to remove at least one spatial distortion. In other embodiments, steps or operations can be provided for determining a height of the image capturing unit and a height of the license plate above the ground for each installation; extracting the license plate recognition data by the license plate recognition unit wherein a state information with respect to the license plate is employed as query into the lookup table to extract a corresponding character height for the state; and calculating the distance of the license plate from the image capturing unit utilizing a predetermined mapping utilizing the physical character height and the pixel character height along with an optical parameter of the image capturing unit.

In still another embodiment, steps or operations can be provided for calculating the distance of ground utilizing an image capturing unit height and a theta value; saving the distance of the ground and the center position coordinates and repeating the process for each captured frame; and computing the license plate height utilizing the image capturing unit height, the license plate distance, and the theta value.

In yet another embodiment, a speed measurement system for identifying a violating vehicle can be implemented. Such a system can include, for example, a processor and a computer-usable medium embodying computer program code, the computer-usable medium being coupled to the data bus. The computer program code can include instructions executable by the processor and configured for capturing a vehicle image utilizing at least one image-capturing unit in order to estimate a speed of the vehicle via an automatic license plate recognition unit and thereafter locate and extract license plate character data from the vehicle image; calculating a license plate distance from the image capturing utilizing a physical character height from a reference point of the image capturing unit and a pixel character height generated by the automatic license plate recognition unit; generating a ground map that translates a distance of ground from the image capturing unit for each pixel in a field of view of the image capturing unit; and determining a license plate height from a road surface utilizing a position of the license plate in the field of view in association with the distance information to thereafter accurately estimate the vehicle speed based on the license plate height.

In another embodiment, the aforementioned instructions for generating a ground map that translates a distance of ground from the image capturing unit for each pixel in a field of view of the image capturing unit can be further configured for generating a ground map that translates a distance of ground from the image capturing unit for each pixel in a field of view of the image capturing unit utilizing a calibration process.

In other embodiments, such instructions can be further configured for implementing the calibration process by: driving a reference vehicle having at least one plate attached to at least one height via the field of view of the image capturing unit a plurality of times across a plurality of lanes in order to cover the road; accurately building the ground map to cover a plurality of cases and thereafter passing each captured frame to the automatic license plate recognition unit to save automatic license plate recognition data; and configuring a lookup table to map the license plate recognition data to the license plate height from a ground level. In another embodiment, the aforementioned automatic license plate recognition data can further include, for example, one or more of a license plate code, at least one license plate center coordinate, and a license plate character height, etc.

In other embodiments, such instructions can be further configured for determining the license plate height utilizing the plate code as a reference data. In still other embodiments, such instructions can be further configured for implementing the calibration process by: configuring a hitch calibration target having at least two vertical risers with a plurality of rice shaped reflective targets spaced at an equal increment and a horizontal grid of reflective globes spaced at a known spacing; collecting a plurality of data points for each pass of the vehicle through the field of view of the image capturing unit thereby requiring fewer passes utilizing the hitch calibration target; and locating a center of the plurality of reflective globes by considering a known spacing and thereby calculating a center for each close pair and a height of the center as a function of distance and a x,y position.

In another embodiment, such instructions can be further configured for localizing the license plate in the vehicle image and segmenting the license plate character data including the license plate code to remove at least one spatial distortion. In still another embodiment, such instructions can be further configured for determining a height of the image capturing unit and a height of the license plate above the ground for each installation; extracting the license plate recognition data by the license plate recognition unit wherein a state information with respect to the license plate is employed as query into the lookup table to extract a corresponding character height for the state; and calculating the distance of the license plate from the image capturing unit utilizing a predetermined mapping utilizing the physical character height and the pixel character height along with an optical parameter of the image capturing unit.

In another embodiment, such instructions can be further configured for calculating the distance of ground utilizing an image capturing unit height and a theta value; saving the distance of the ground and the center position coordinates and repeating the process for each captured frame; and computing the license plate height utilizing the image capturing unit height, the license plate distance, and the theta value.

In still other embodiments, a processor-readable medium can be implemented for storing code representing instructions to cause a processor to perform a process of vehicle speed measurement for identifying a violating vehicle. Such code can include code to, for example, capture a vehicle image utilizing at least one image-capturing unit in order to estimate a speed of the vehicle via an automatic license plate recognition unit and thereafter locate and extract license plate character data from the vehicle image; calculate a license plate distance from the image capturing unit utilizing a physical character height from a reference point of the image capturing unit and a pixel character height generated by the automatic license plate recognition unit; generate a ground map that translates a distance of ground from the image capturing unit for each pixel in a field of view of the image capturing unit; and determine a license plate height from a road surface utilizing a position of the license plate in the field of view in association with the distance information to thereafter accurately estimate the vehicle speed based on the license plate height.

In another embodiment, such code can comprise code to, for example, generate a ground map that translates a distance of ground from the image capturing unit for each pixel in a field of view of the image capturing unit utilizing a calibration process.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A vehicle speed measurement method for identifying a violating vehicle, said method comprising:
    capturing a vehicle image utilizing at least one image capturing unit in order to estimate a speed of said vehicle via an automatic license plate recognition unit and thereafter locate and extract license plate character data from said vehicle image;
    calculating a license plate distance from said image capturing unit utilizing a physical character height from a reference point of said image capturing unit and a pixel character height generated by said automatic license plate recognition unit;
    generating a ground map that translates a distance of ground from said image capturing unit for each pixel in a field of view of said image capturing unit utilizing a calibration process; and
    implementing said calibration process by: configuring a hitch calibration target having at least two vertical risers with a plurality of rice shaped reflective targets spaced at an equal increment and a horizontal grid of reflective globes spaced at a known spacing; collecting a plurality of data points for each pass of said vehicle through said field of view of said image capturing unit thereby requiring fewer passes utilizing said hitch calibration target; and locating a center of said plurality of reflective globes by considering a known spacing and thereby calculating a center for each close pair and a height of said center as a function of distance and a x, y position;
    determining a license plate height from a road surface utilizing a position of said license plate in said field of view in association with said license plate distance to thereafter accurately estimate said vehicle speed based on said license plate height.

2. The method of claim 1 further comprising implementing said calibration process by:
    driving a reference vehicle having at least one plate attached to at least one height via said field of view of said image capturing unit a plurality of times across a plurality of lanes in order to cover said road;
    accurately building said ground map to cover a plurality of cases and thereafter passing each captured frame to said automatic license plate recognition unit to save automatic license plate recognition data; and configuring a lookup table to map said license plate recognition data to said license plate height from a ground level.

3. The method of claim 2 wherein said license plate recognition data further comprises:
a license plate code;
at least one license plate center coordinate, and
a license plate character height.

4. The method of claim 3 further comprising:
localizing said license plate in said vehicle image; and
segmenting said license plate character data including said license plate code to remove at least one spatial distortion.

5. The method of claim 1 further comprising determining said license plate height utilizing said plate code as a reference data.

6. The method of claim 1 further comprising:
determining a height of said image capturing unit and a height of said license plate above said ground for each installation;
extracting said license plate recognition data by said license plate recognition unit wherein a state information with respect to said license plate is employed as query into said lookup table to extract a corresponding character height for said state; and
calculating said distance of the license plate from said image capturing unit utilizing a predetermined mapping utilizing said physical character height and said pixel character height along with an optical parameter of said image capturing unit.

7. The method of claim 1 further comprising:
calculating said distance of ground utilizing an image capturing unit height and a theta value;
saving said distance of said ground and said center position coordinates and repeating said process for each captured frame; and
computing said license plate height utilizing said image capturing unit height, said license plate distance, and said theta value.

8. A speed measurement system for identifying a violating vehicle, said system comprising: a processor; and
a computer-usable medium embodying computer program code, said computer-usable medium being coupled to said data bus, said computer program code comprising instructions executable by said processor and configured for:
capturing a vehicle image utilizing at least one image-capturing unit in order to estimate a speed of said vehicle via an automatic license plate recognition unit and thereafter locate and extract license plate character data from said vehicle image;
calculating a license plate distance from said image capturing unit utilizing a physical character height from a reference point of said image capturing unit and a pixel character height generated by said automatic license plate recognition unit;
generating a ground map that translates a distance of ground from said image capturing unit for each pixel in a field of view of said image capturing unit utilizing a calibration process; and
implementing said calibration process by: configuring a hitch calibration target having at least two vertical risers with a plurality of rice shaped reflective targets spaced at an equal increment and a horizontal grid of reflective globes spaced at a known spacing; collecting a plurality of data points for each pass of said vehicle through said field of view of said image capturing unit thereby requiring fewer passes utilizing said hitch calibration target; and locating a center of said plurality of reflective globes by considering a known spacing and thereby calculating a center for each close pair and a height of said center as a function of distance and a x, y position;
determining a license plate height from a road surface utilizing a position of said license plate in said field of view in association with said license plate distance to thereafter accurately estimate said vehicle speed based on said license plate height.

9. The system of claim 8 wherein said instructions are further configured for implementing said calibration process by:
driving a reference vehicle having at least one plate attached to at least one height via said field of view of said image capturing unit a plurality of times across a plurality of lanes in order to cover said road;
accurately building said ground map to cover a plurality of cases and thereafter passing each captured frame to said automatic license plate recognition unit to save automatic license plate recognition data; and
configuring a lookup table to map said license plate recognition data to said license plate height from a ground level.

10. The system of claim 9 wherein said automatic license plate recognition data further comprises at least one of:
a license plate code;
at least one license plate center coordinate, and
a license plate character height.

11. The system of claim 10 wherein said instructions are further configured for:
localizing said license plate in said vehicle image; and
segmenting said license plate character data including include said license plate code to remove at least one spatial distortion.

12. The system of claim 8 wherein said instructions are further configured for determining said license plate height utilizing said plate code as a reference data.

13. The system of claim 8 wherein said instructions are further configured for:
determining a height of said image capturing unit and a height of said license plate above said ground for each installation;
extracting said license plate recognition data by said license plate recognition unit wherein a state information with respect to said license plate is employed as query into said lookup table to extract a corresponding character height for said state; and
calculating said distance of the license plate from said image capturing unit utilizing a predetermined mapping utilizing said physical character height and said pixel character height along with an optical parameter of said image capturing unit.

14. The system of claim 8 wherein said instructions are further configure for:
calculating said distance of ground utilizing an image capturing unit height and a theta value;
saving said distance of said ground and said center position coordinates and repeating said process for each captured frame; and
computing said license plate height utilizing said image capturing unit height, said license plate distance, and said theta value.

15. A non-transitory processor-readable medium storing code representing instructions to cause a processor to perform a process of vehicle speed measurement for identifying a violating vehicle, said code comprising code to:

capture a vehicle image utilizing at least one image-capturing unit in order to estimate a speed of said vehicle via an automatic license plate recognition unit and thereafter locate and extract license plate character data from said vehicle image;

calculate a license plate distance from said image capturing unit utilizing a physical character height from a reference point of said image capturing unit and a pixel character height generated by said automatic license plate recognition unit;

generate a ground map that translates a distance of ground from said image capturing unit for each pixel in a field of view of said image capturing unit; and implement said calibration process by: configuring a hitch calibration target having at least two vertical risers with a plurality of rice shaped reflective targets spaced at an equal increment and a horizontal grid of reflective globes spaced at a known spacing; collecting a plurality of data points for each pass of said vehicle through said field of view of said image capturing unit thereby requiring fewer passes utilizing said hitch calibration target; and locating a center of said plurality of reflective globes by considering a known spacing and thereby calculating a center for each close pair and a height of said center as a function of distance and a x, y position;

determine a license plate height from a road surface utilizing a position of said license plate in said field of view in association with said license plate distance to thereafter accurately estimate said vehicle speed based on said license plate height.

* * * * *